United States Patent
Lin et al.

(10) Patent No.: US 7,768,604 B2
(45) Date of Patent: Aug. 3, 2010

(54) TRANSFLECTIVE LIQUID CRYSTAL DISPLAY WITH PARTIALLY SHIFTED REFLECTIVITY CURVE

(75) Inventors: Ching-Huan Lin, Hsin Ying (TW);
Chih-Ming Chang, Jhongli (TW)

(73) Assignee: Au Optronics Corporation, Hsinchu (TW)

( * ) Notice: Subject to any disclaimer, the term of this patent is extended or adjusted under 35 U.S.C. 154(b) by 934 days.

(21) Appl. No.: 11/230,393

(22) Filed: Sep. 20, 2005

(65) Prior Publication Data

US 2007/0064182 A1    Mar. 22, 2007

(51) Int. Cl.
*G02F 1/1343* (2006.01)
*G02F 1/1333* (2006.01)

(52) U.S. Cl. .......................... 349/114; 349/48
(58) Field of Classification Search .............. 349/114, 349/48
See application file for complete search history.

(56) References Cited

U.S. PATENT DOCUMENTS

| | | | | |
|---|---|---|---|---|
| 4,714,983 A | 12/1987 | Lang | | 362/27 |
| 5,841,494 A | 11/1998 | Hall | | 349/98 |
| 6,008,871 A | 12/1999 | Okumura | | 349/61 |
| 6,084,650 A | 7/2000 | Sekiguchi | | 349/106 |
| 6,124,905 A | 9/2000 | Iijima | | 349/62 |
| 6,199,989 B1 | 3/2001 | Maeda et al. | | 359/613 |
| 6,466,280 B1 | 10/2002 | Park et al. | | 349/43 |
| 6,508,560 B2 | 1/2003 | Epstein et al. | | 359/606 |
| 6,567,060 B1 | 5/2003 | Sekiguchi | | 345/87 |
| 6,567,141 B1 | 5/2003 | Kaneko et al. | | 349/117 |
| 6,574,044 B1 | 6/2003 | Sahouani et al. | | 359/498 |
| 6,577,361 B1 | 6/2003 | Sekiguchi et al. | | 349/96 |
| 6,580,480 B2 | 6/2003 | Baek et al. | | 349/114 |
| 6,606,139 B2 | 8/2003 | Yoshii et al. | | 349/114 |
| 6,608,660 B1 | 8/2003 | Okamoto et al. | | 349/113 |
| 6,611,305 B2 | 8/2003 | Kamijo et al. | | 349/112 |
| 6,628,369 B2 * | 9/2003 | Kumagai et al. | | 349/194 |
| 7,286,192 B2 * | 10/2007 | Lin et al. | | 349/41 |
| 2003/0214472 A1* | 11/2003 | Chen | | 345/87 |
| 2005/0036091 A1* | 2/2005 | Song | | 349/129 |
| 2006/0139522 A1* | 6/2006 | Chang et al. | | 349/114 |

FOREIGN PATENT DOCUMENTS

JP    2004-139056    5/2004
TW    594318        6/2004

* cited by examiner

*Primary Examiner*—David Nelms
*Assistant Examiner*—Lauren Nguyen
(74) *Attorney, Agent, or Firm*—Ware, Fressola, Van Der Sluys & Adolphson, LLP

(57) ABSTRACT

A transflective liquid crystal display having a plurality of pixels, each pixel having a plurality of color sub-pixels. Each sub-pixel comprises a reflective electrode, a transmissive electrode connected to a secondary reflective electrode. The transmissive electrode is associated with a color filter, while one only of the reflective electrode and the secondary reflective electrode is associated with a color filter. The transmissive electrode is associated with a first charge storage capacitance. The reflective electrode is associated with a second charge storage capacitance which is adjustable depending on the operating states of the liquid crystal display.

24 Claims, 16 Drawing Sheets

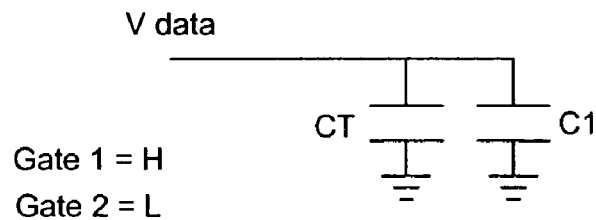
FIG. 9a
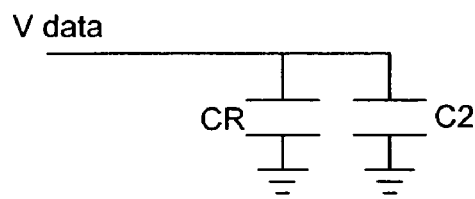
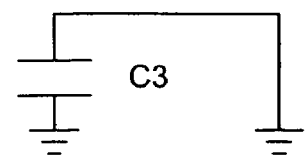
FIG. 9b  FIG. 9c
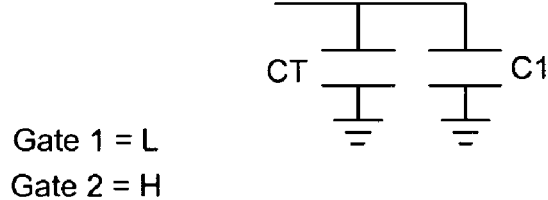
FIG. 10a
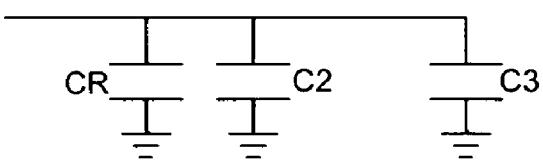
FIG. 10b

TRANSFLECTIVE LIQUID CRYSTAL DISPLAY WITH PARTIALLY SHIFTED REFLECTIVITY CURVE

CROSS REFERENCE TO RELATED APPLICATIONS

The present application is related to U.S. patent application Ser. No. 11/146,568, filed Jun. 7, 2005, assigned to the assignee of the present invention.

FIELD OF THE INVENTION

The present invention relates generally to a liquid crystal display panel and, more particularly, to a transflective-type liquid crystal display panel.

BACKGROUND OF THE INVENTION

Due to the characteristics of thin profile and low power consumption, liquid crystal displays (LCDs) are widely used in electronic products, such as portable personal computers, digital cameras, projectors, and the like. Generally, LCD panels are classified into transmissive, reflective, and transflective types. A transmissive LCD panel uses a back-light module as its light source. A reflective LCD panel uses ambient light as its light source. A transflective LCD panel makes use of both the back-light source and ambient light.

As known in the art, a color LCD panel 1 has a two-dimensional array of pixels 10, as shown in FIG. 1. Each of the pixels comprises a plurality of sub-pixels, usually in three primary colors of red (R), green (G) and blue (B). These RGB color components can be achieved by using respective color filters. FIG. 2 illustrates a plan view of the pixel structure in a conventional transflective liquid crystal panel, and FIGS. 3a and 3b are cross sectional views of the pixel structure. As shown in FIG. 2, a pixel can be divided into three sub-pixels 12R, 12G and 12B and each sub-pixel can be divided into a transmission area (TA) and a reflection area (RA). In the transmission area as shown in FIG. 3a, light from a back-light source enters the pixel area through a lower substrate 30, and goes through a liquid crystal layer, a color filter R and the upper substrate 20. In the reflection area, light encountering the reflection area goes through an upper substrate 20, the color filter R and the liquid crystal layer before it is reflected by a reflective layer 52. Alternatively, part of the reflective area is covered by a non-color filter (NCF), as shown in FIG. 3b.

As known in the art, there are many more layers in each pixel for controlling the optical behavior of the liquid crystal layer. These layers may include a device layer 50 and one or two electrode layers. The device layer is typically disposed on the lower substrate and comprises gate lines 31, 32, data lines 21-24 (FIG. 2), transistors, and passivation layers (not shown).

In a single-gap transflective LCD, one of the major disadvantages is that, the transmissivity of the transmission area (the V-T curve) and the reflectivity in the reflection area (the V-R curve) do not reach their peak values in the same voltage range. As shown in FIG. 3c, the V-R curve is peaked at about 2.8v, while the "flat" section of the V-T curve is between 3.7 - 5v. The reflectivity experiences an inversion while the transmissivity is approaching its higher value.

SUMMARY OF THE INVENTION

The present invention provides a method and a pixel structure to improve the viewing quality of a transflective-type liquid crystal display. The pixel structure of a pixel in the liquid crystal display comprises a plurality of sub-pixel segments. Each of the sub-pixel segments comprises a transmission area and a reflection area. In the sub-pixel segments, a data line, a first gate line, a second gate line and a common line are used to control the operational voltage on the liquid crystal layer areas associated with the sub-segments. The transmission area has a transmissive electrode associated with a first charge storage capacity and the reflection area has a reflective electrode associated with a second storage capacity. The first and second gate lines can be separately set at a first control state and a second control state. The ratio of the first charge storage capacitor to the second charge storage capacity can be adjusted by an adjustment storage capacitor and controlled according to the states of the gate lines. By adjusting and controlling the adjustment storage capacitor, the potential on the reflective electrode is reduced so as to shift the reflectivity curve toward the higher voltage end. With such a charge refreshing approach, the transmissivity and reflectivity of a single-gap LCD can reach their optimal values at about the same applied voltage. However, the shifting of the reflectivity curve causes a major discrepancy between the transmissivity and reflectivity in the low brightness region and this discrepancy significantly affects the color and contrast of displayed image.

In order to improve the viewing quality of the display in the low brightness region, the transmissive electrode is connected to a further reflective electrode so as to retain part of the unshifted reflectivity curve.

The present invention will become apparent upon reading the description taken in conjunction of FIGS. 4 to 17b.

BRIEF DESCRIPTION OF THE DRAWINGS

FIG. 6a is a schematic presentation of a cross sectional view showing the color filtering arrangement of FIG. 5a.

FIG. 9a is the equivalent circuit of the transmission area of FIG. 8a when the gate lines are set at a first control state.

FIG. 9b is the equivalent circuit of the reflection area of FIG. 8b when the gate lines are set at the first control state.

FIG. 9c is the equivalent circuit of the adjustment storage capacitor of FIG. 8b when the gate lines are set at the first control state.

FIG. 10a is the equivalent circuit of the transmission area of FIG. 8a when the gate lines are set at a second control state.

FIG. 10b is the equivalent circuit of the reflection area of FIG. 8b when the gate lines are set at a second control state.

DETAILED DESCRIPTION OF THE INVENTION

Figure 1:
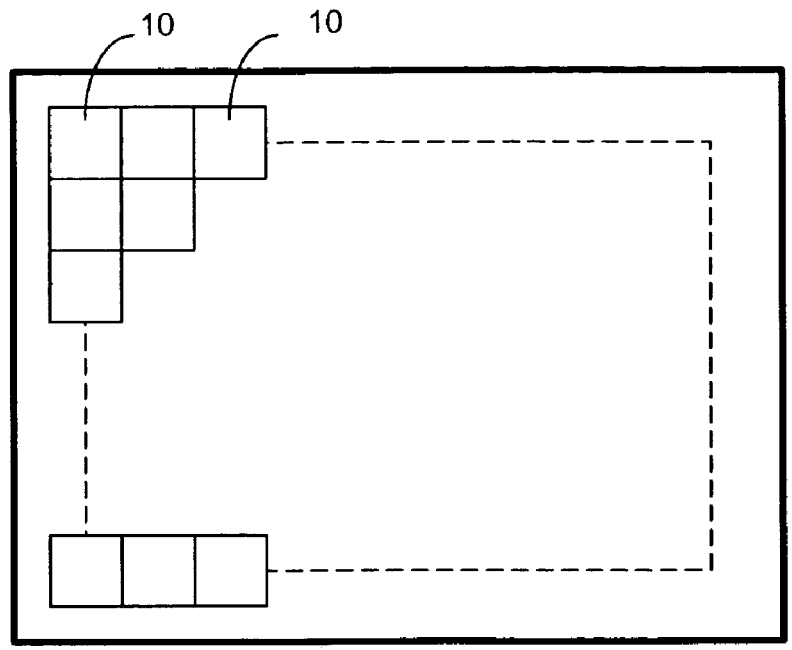
FIG. 1 is a schematic representation showing a typical LCD display.
Figure 2:
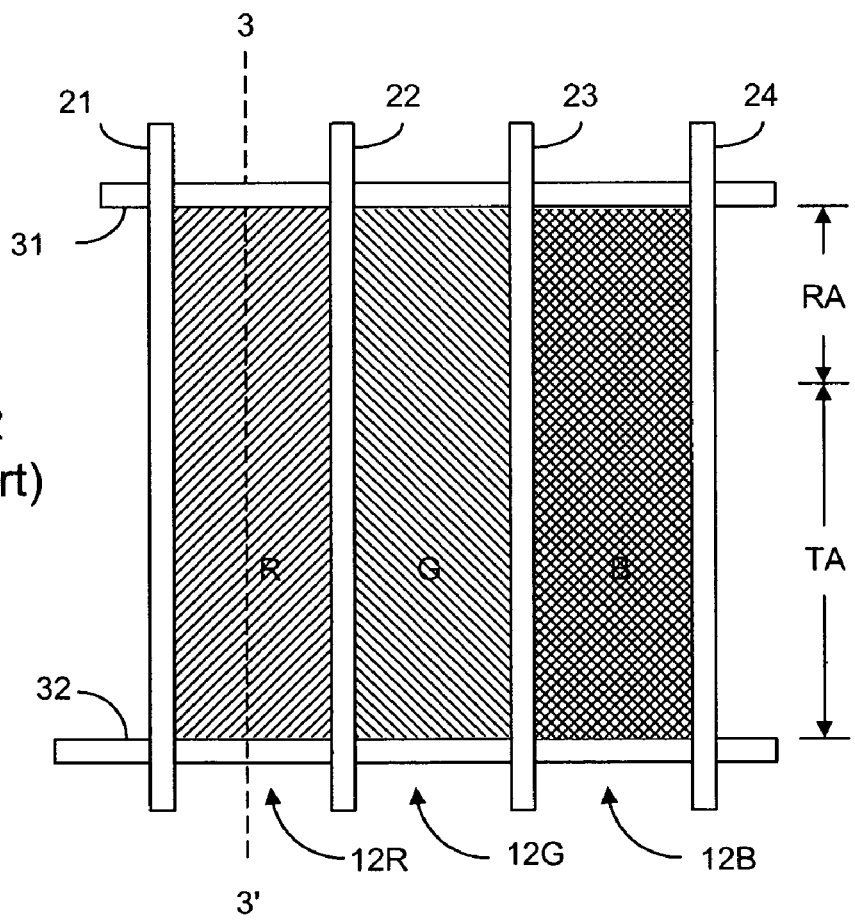
FIG. 2 is a plan view showing the pixel structure of a conventional transflective color LCD display.
Figure 3A:
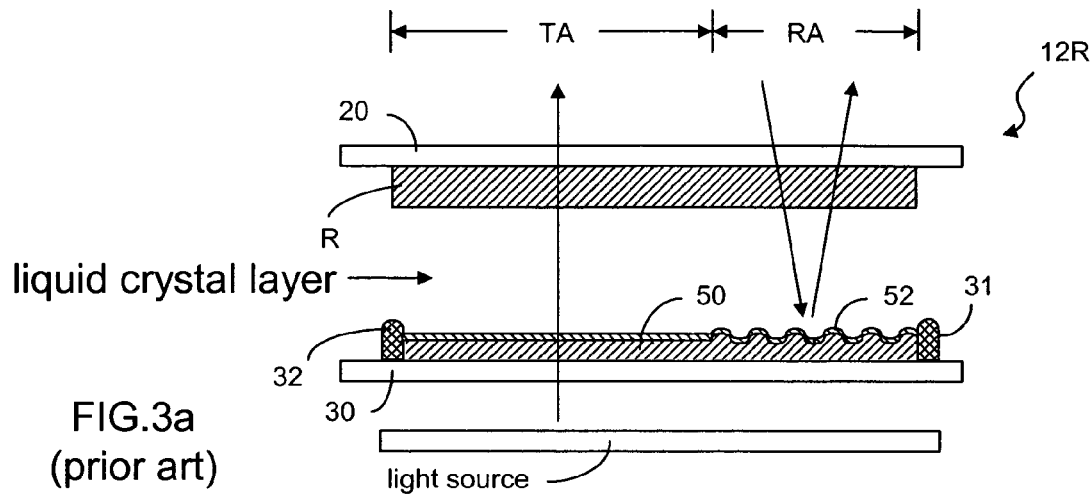
FIG. 3a is a cross sectional view showing the reflection and transmission of light beams in the pixel as shown in FIG. 2.
Figure 3B:
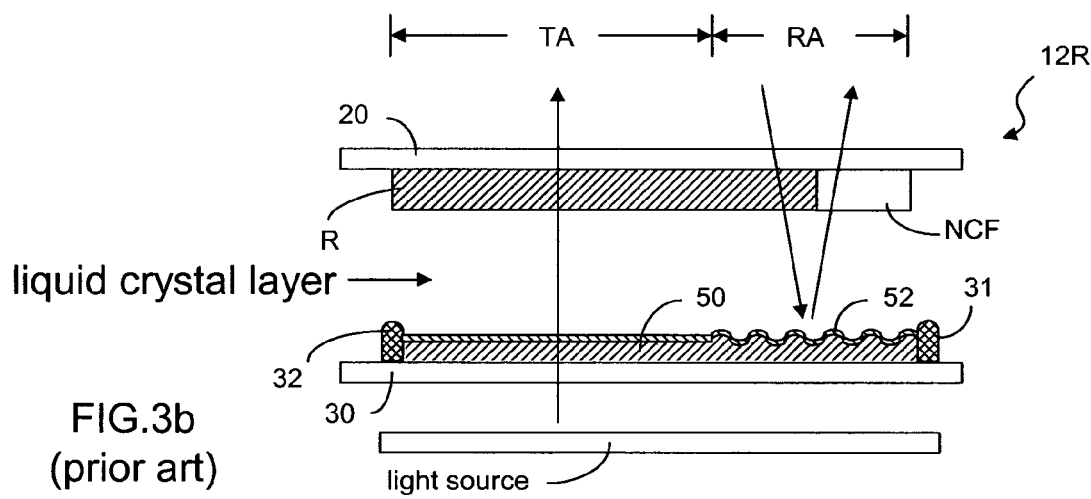
FIG. 3b is a cross sectional view showing the reflection and transmission of light beams in another prior art transflective display.
Figure 3C:
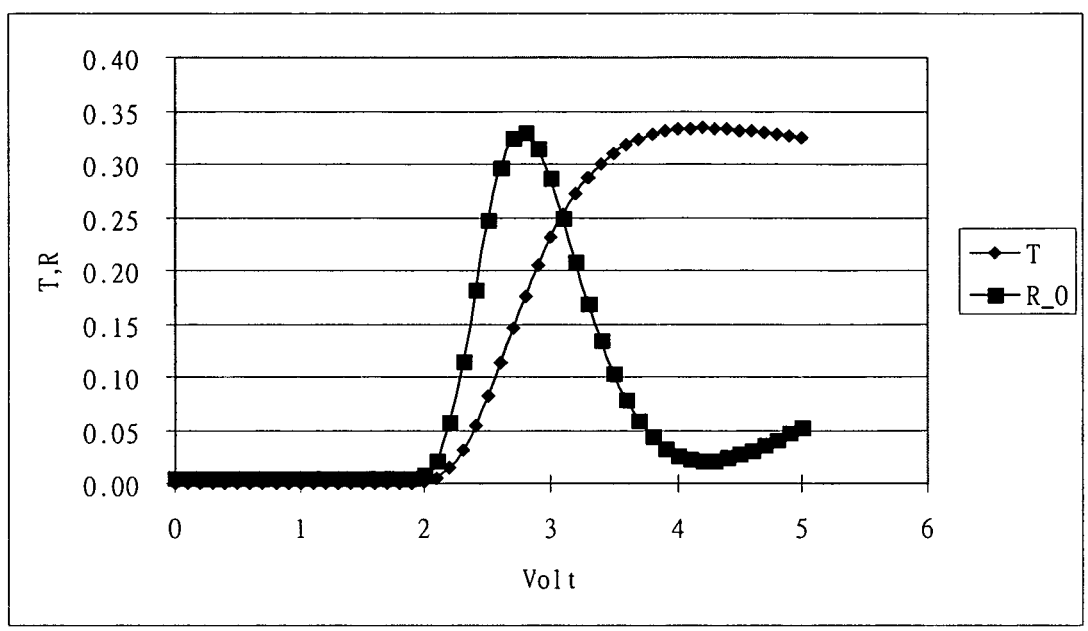
FIG. 3c is a plot of transmissivity (T) and reflectively (R) against applied voltage (V) in a prior art single-gap transflective LCD.
Figure 4:
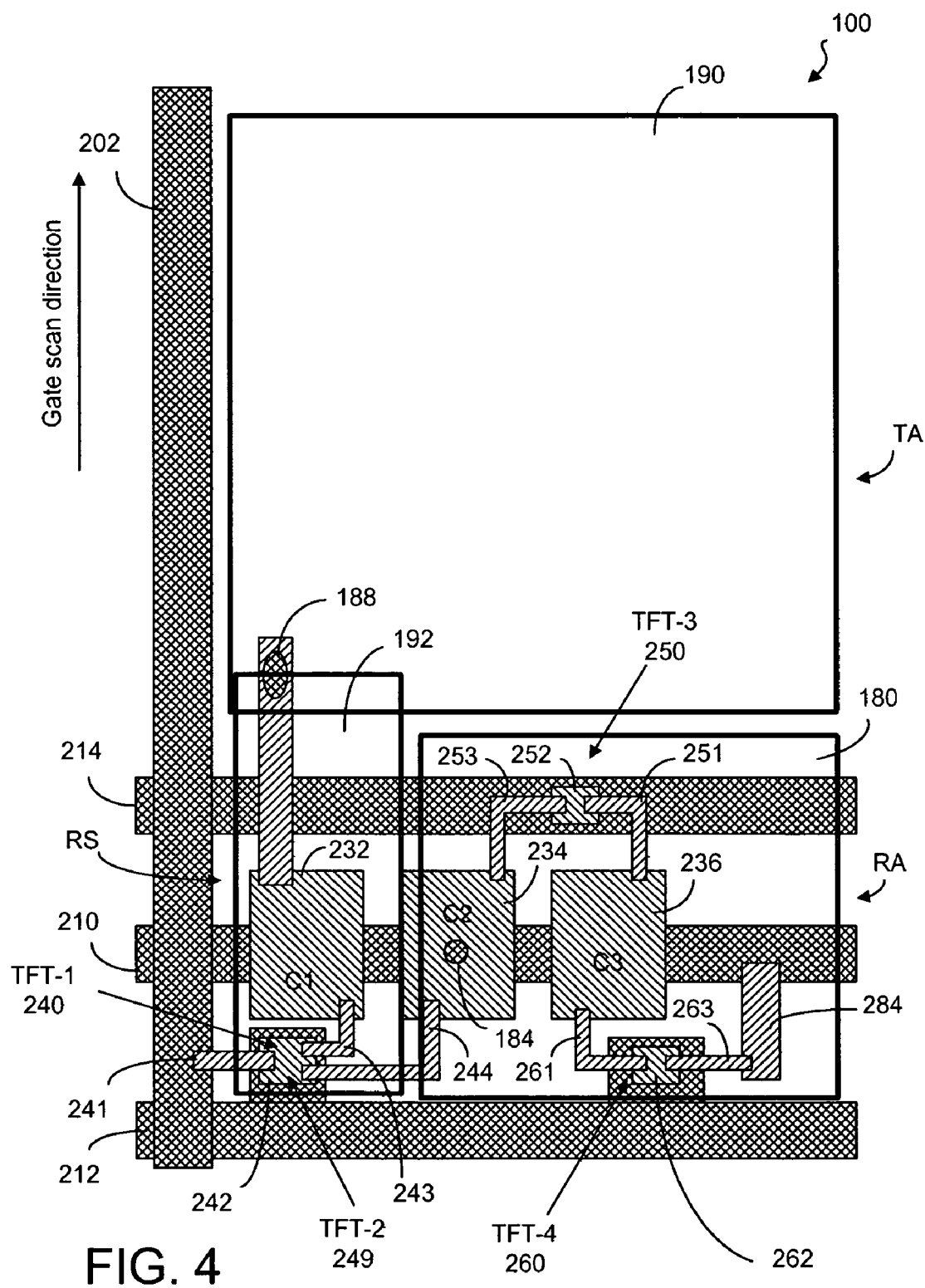
FIG. 4 is a plan view illustrating a sub-pixel segment in a liquid crystal display, according to the present invention.
Figure 5A:
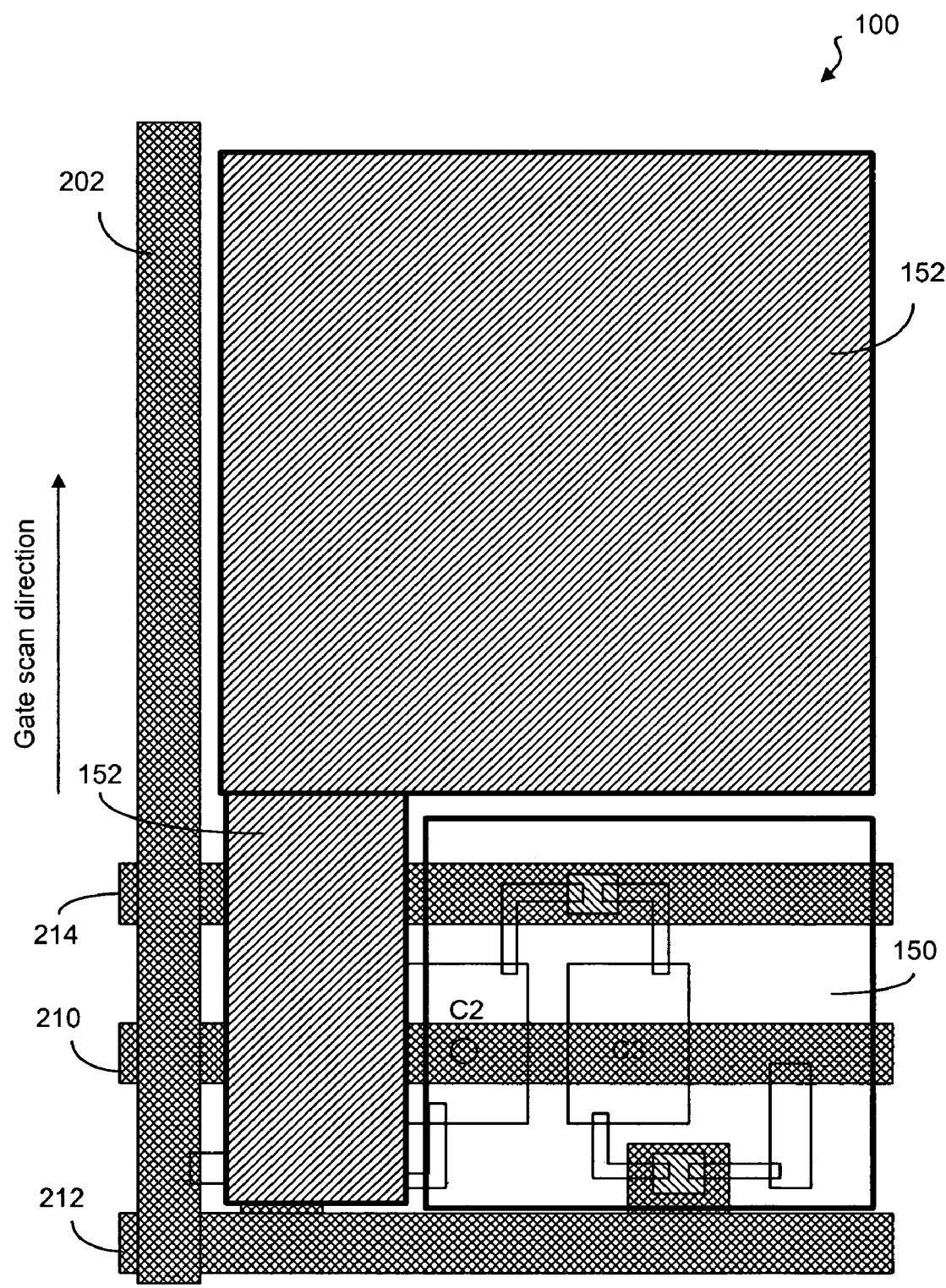
FIG. 5a is a plan view illustrating the color filtering arrangement in a sub-pixel segment, according to one embodiment of the present invention.

A sub-pixel segment, according to one embodiment of the present invention, is shown in FIG. 4. The sub-pixel 100 has a transmission area (TA) and a reflection area (RA). The reflection area (RA) has a reflector or reflective electrode 180. The transmission area (TA) in the sub-pixel 100 has a transparent electrode 190, electrically connected to a secondary reflector 192 in a secondary reflection section (RS). As can be seen in FIG. 5a, the sub-pixel has a color filter 152 to filter the light beam encountering the liquid crystal layer in the transmission area and also in the secondary reflection section. The reflection area has a non-color filter 150. The non-color filter 150 can be made of a clear optical material or a neutral-color filter or a very light color filter.

Figure 5B:
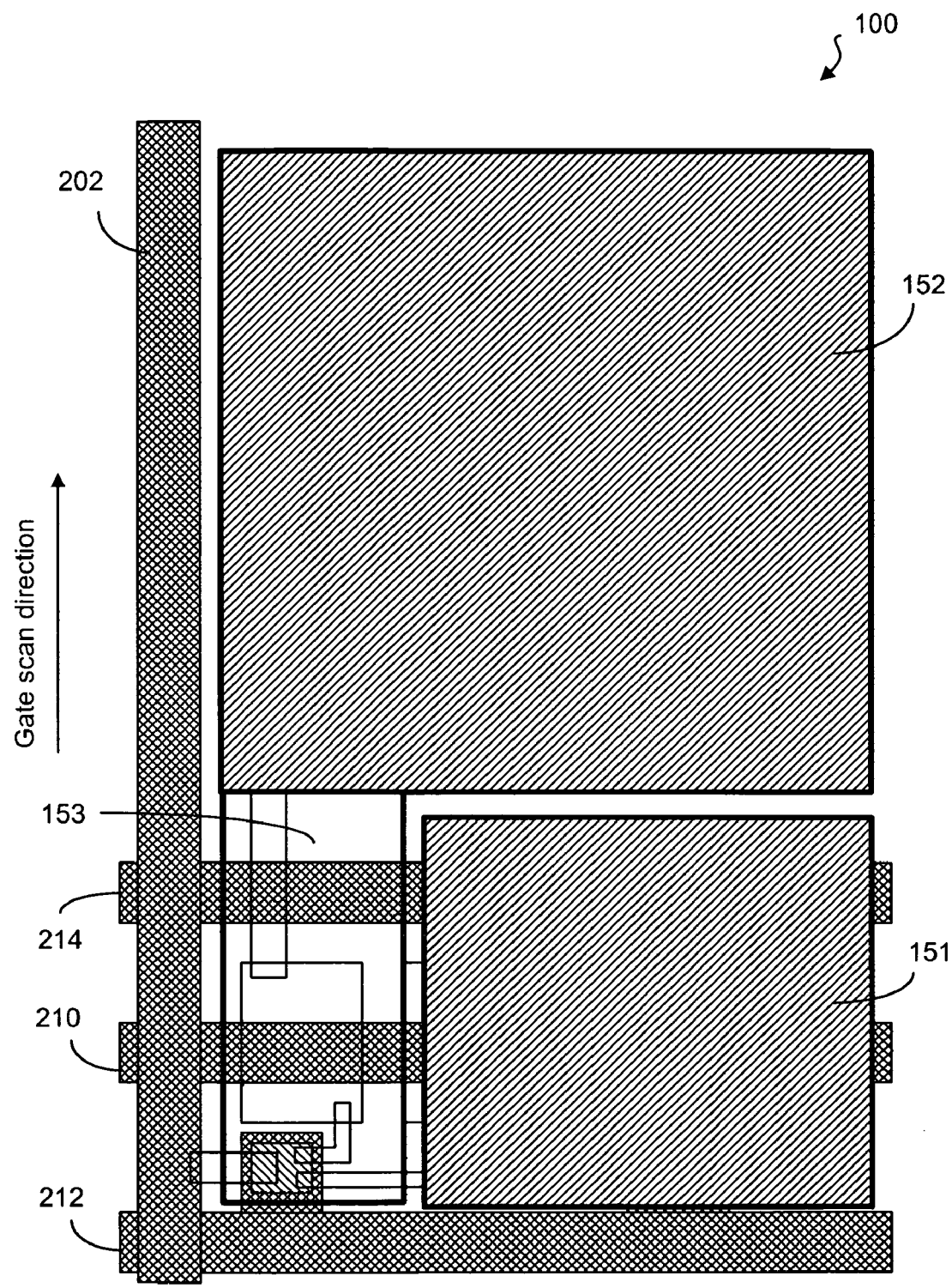
FIG. 5b is a plan view illustrating the color filtering arrangement in a sub-pixel segment, according to another embodiment of the present invention.

Alternatively, the color filter 152 only covers the transmission area, as shown in FIG. 5b. The secondary reflection section does not have a color filter or only has a non-color filter 153. The reflection area has a color filter 151. It is understood that the color filter 151 and the color filter 152 can have substantially the same color and same transmissivity. However, the color filters 151, 152 can have the same color but different transmissivity—that is, one color filter is lighter than the other. The sub-pixel 100 has a data line 202, a first gate line 212, a second gate line 214 and a common line 210. As shown in FIG. 4, the transmission area is associated with a first storage capacitor 232 (C1), while the reflection area is associated with a second storage capacitor 234 (C2) and a charge refreshing capacitor or adjustment storage capacitor 236 (C3). The capacitor 232 is electrically connected to the transparent electrode 190 and the secondary reflector 192 through a via 188. The capacitor 232 is also electrically connected to the data line 202 and the first gate line 212 through a first semiconductor switching element 240 (TFT-1). The second capacitor 234 is electrically connected to the reflector 180 through a via 184. The second capacitor 234 is also electrically connected to the data line 202 and the first gate line 212 through the second switching element 249 (TFT-2). The second capacitor 234 is further connected to the adjustment capacitor 236 through a second semiconductor switching element 250 (TFT-3). The adjustment capacitor 236 is electrically connected to the common line 210 through a fourth switching element 260 (TFT-4). The first switching element 240 has a first switch end 241, a second switch end 243 and a control end 242. The second switching element 249 has a first switch end 241, a second switch end 244 and a control end 242. The first switch end 241 is electrically connected to the data line 202, and the control end 242 is electrically connected to the first gate line 212. The third switching element 250 has a first switch end 251, a second switch end 253 and a control end 252. The control end 252 is electrically connected to the second gate line 214. The fourth switching element 260 has a first switch end 261, a second switch end 263 and a control end 262. The second switch end 263 is electrically connected to the common line 210 via an electrically conductive segment 284, and the control end 262 is electrically connected to the first gate line 212.

Figure 6A:
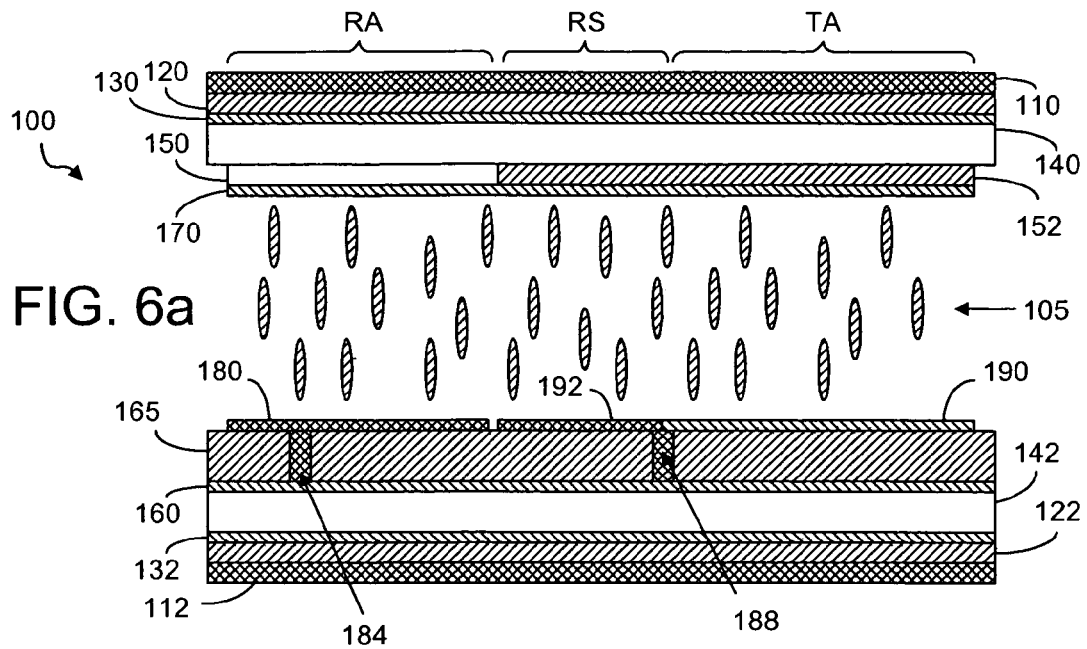
Figure 6B:
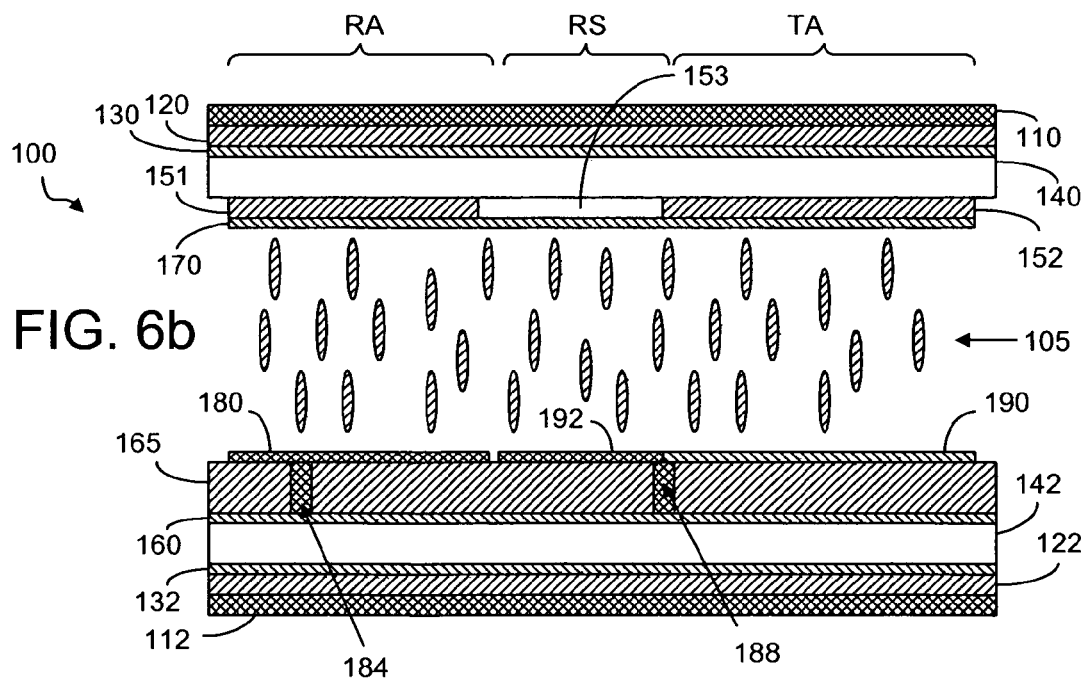
FIG. 6b is a schematic presentation of a cross sectional view showing the color filtering arrangement of FIG. 5b.

The color filtering arrangement and the electrical components of the sub-pixel segment 100 are schematically illustrated in FIGS. 6a and 6b. As can be seen in FIGS. 6a and 6b, the sub-pixel segment 100 has a pair of polarizers 110, 112, a pair of half-wave plates 120, 122 and a pair of quarter-wave plates 130, 132. The upper component layers are disposed on the upper side of the transparent substrate 140. The lower component layers are disposed on the lower side of the transparent substrate 142. Disposed on the upper side of the transparent substrate 142 is a device layer 160. The device layer 160 comprises the storage capacitors 232, 234, 236 and the switching elements 240, 250, 260. The reflectors 180, 192 and the transparent electrode 190 are generally electrically insulated from the device layer 160 by a passivation layer 165, but electrically connected to device layer through vias 184 and 188.

As shown in FIG. 6a, a light beam encountering the sub-pixel segment 100 are filtered by the color filter 152 associated with the secondary reflector 192 in the secondary reflection section (RS) and the transparent electrode 190 in the transmission area (TA). The filter 150 associated with the reflector 180 in the reflection area (RA) is a non-color filter as illustrated in FIG. 5a. The filters 150 and 152 are disposed between the transparent substrate 140 and a common transparent electrode 170.

As shown in FIG. 6b, the non-color filter 153 is associated with the secondary reflector 192 in the secondary reflection section (RS). The color filter 152 is associated with the transparent electrode 190 of the transmission area (TA). The color filter 151 is associated with the reflector 180 in the reflection area (RA). The transparent electrodes 170,190 are usually made from indium-tin oxide (ITO).

Figure 7:
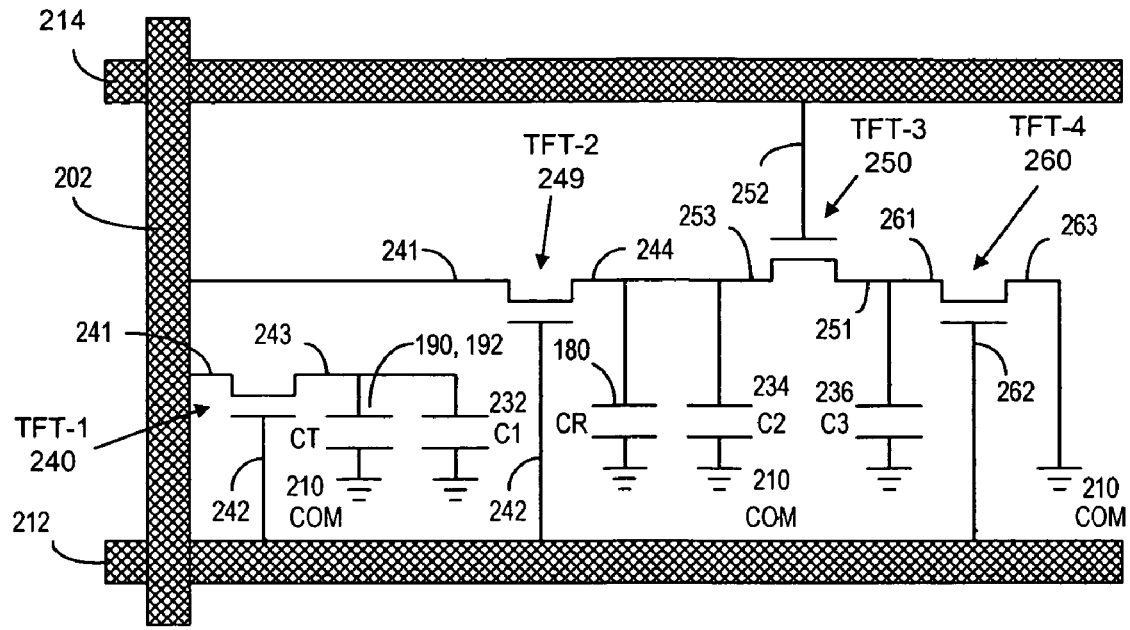
FIG. 7 is a circuit diagram showing the equivalent circuit of the sub-pixel segment of FIG. 4.

The equivalent circuit for the electronic components in the sub-pixel segment 100 is shown in FIG. 7. As shown, the transparent electrode 190 and the secondary reflector 192 together have a capacitance CT connected through the via 188 to the first storage capacitor 232 (C1) in parallel. These capacitors are connected to the data line 214 via the switch ends 243, 241 of the first switching element 240. The reflector 180 has a capacitance CR separately connected to the second storage capacitor 234 (C2) in parallel. These capacitors are also connected through the via 184 to the data line 214 via the switch ends 244, 241 of the second switching element 249. The capacitor 234 is also connected to the adjustment capacitor 236 in parallel via the switch ends 253, 251 of the second switching element 250. The adjustment capacitor 236 is also connected to the common line 210 through the switch ends 261, 263 of the fourth switching element 260.

Figure 8A:
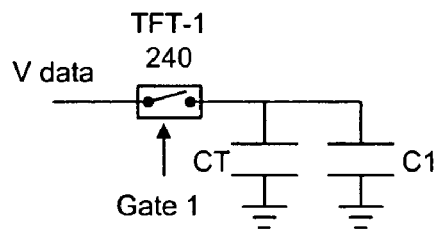
FIG. 8a is the equivalent circuit of the transmission area in the sub-pixel segment of FIG. 4.
Figure 8B:
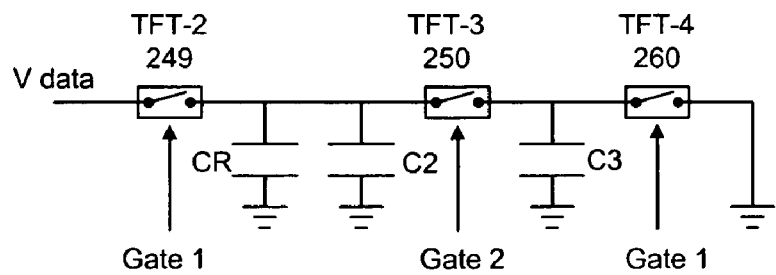
FIG. 8b is the equivalent circuit of the reflection area in the sub-pixel segment of FIG. 4.

As shown in FIG. 8a, the charging and discharging of the capacitors CT and C1 is controlled by gate-line 1 through the control end 242 (see FIG. 7) of the first switching element 240. As shown in FIG. 8b, the charging and discharging of the capacitors CR, C2 and C3 are controlled by gate-line 2 through the control end 252 (see FIG. 7) of second switching element 250, and by gate-line 1 through both the control end 242 of the second switching element 249 and the control end 262 of the fourth switching element 260.

In the first control state, gate-line 1 is set to high and gate-line 2 is set to low. When gate-line 1=high, the switching element 240 and the switching element 260 are "ON". When gate-line 2=low, the switching element 250 is "OFF". In this control state, the capacitors CT and C1 are connected to the data line 202, as shown in FIG. 9a. Thus, the transparent electrode 190 and the reflector 192 have the same potential ($V_{data}$) of the data line 202. The capacitors CR and C2 are operatively connected to the data line 202, but disconnected from the adjustment capacitor C3, as shown in FIGS. 9b and 9c. Thus, the reflector 180 has the same potential ($V_{data}$) of the data line 202. The adjustment capacitor C3 is discharged, but its potential is in equilibrium with the voltage on common line 210.

Figure 11A:
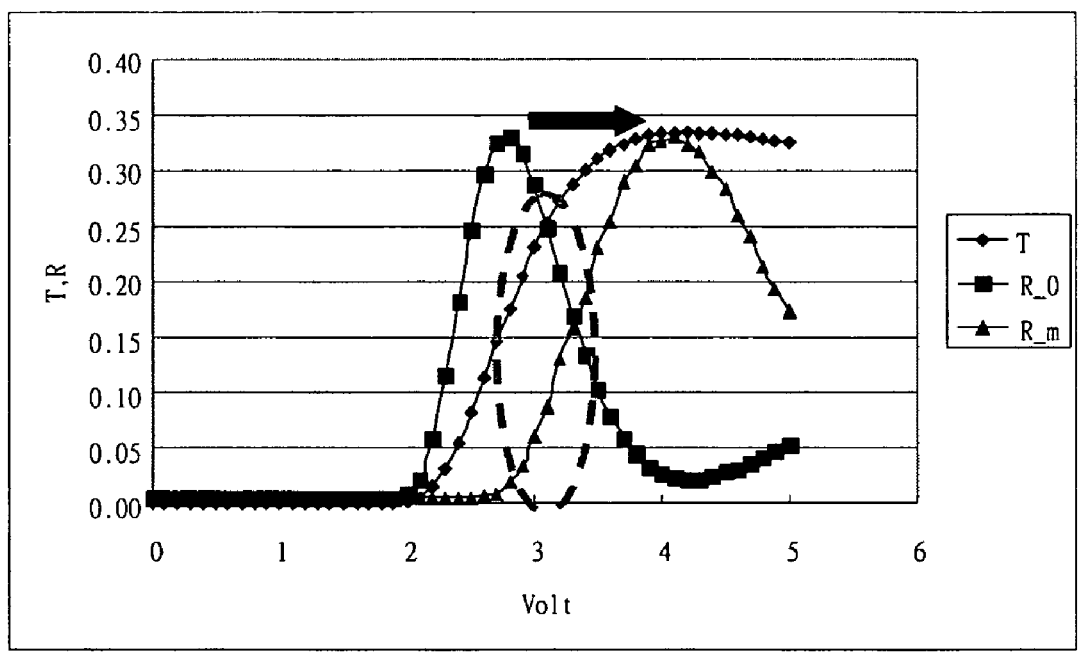
FIG. 11a is a plot of transmissivity (T) and reflectively (R) against applied voltage (V) showing the shifting of the R-V curve as a result of the adjustment of charge storage capacity associated with the reflection area.

In the second control state, gate-line 1 is set to low and gate-line 2 is set to high. When gate-line 1=low, the switching element 240 and the switching element 260 are "OFF". When gate-line 2=high, the switching element 250 is "ON". In this control state, the capacitors CT and C1 are disconnected from the data line 202, as shown in FIG. 10a. The capacitors CT and C1 maintain their voltage potential for a period of time. Thus, the transparent electrode 190 and the secondary reflector 192 substantially maintain their original potential $V_{data}$. The capacitors CR and C2 are now connected to the adjustment capacitor C3 in parallel as shown in FIG. 10b. The overall capacitance associated with the reflector 180 is increased from (CR+C2) to (CR+C2+C3). As a result, the potential on the reflector 180 is reduced. As such, the reflectivity curve is shifted toward the higher voltage end. The shifted-reflectivity curve is shown in FIG. 11a. As shown in FIG. 11a, the reflectivity curve (R_0) is peaked at about 2.8 v, whereas the shifted-reflectivity curve (R_m) is peaked at about 4 v. In this illustrative example, C3/(CR+C2+C3)=⅖. With charge refreshing, the transmissivity and reflectivity of a single-gap LCD can be peaked at about the same applied voltage. The inversion in the reflectivity relative to the transmissivity can be avoided.

Figure 11B:
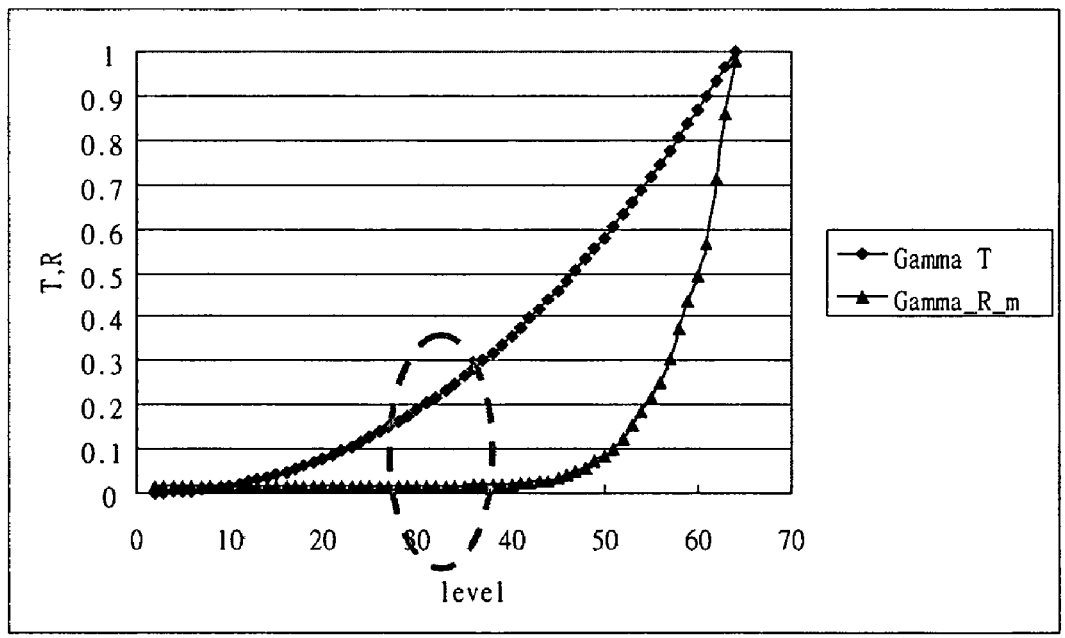
FIG. 11b is a plot of transmissivity and reflectivity as a function of gamma level.

However, while the transmitivity starts to increase rapidly at about 2.2 v, the reflectivity remains low until about 2.8 v. In this low brightness region, the discrepancy in the transmissivity and reflectivity also causes the discrepancy between the gamma curve associated with the transmissivity and the gamma curve associated with the reflectivity, as shown in FIG. 11b. FIG. 11b shows the transmissivity and reflectivity as a function of gamma level. In order to reduce the discrepancy between transmissivity and reflectivity, a multi-threshold harmonization (MTH) approach is used.

According to the present invention, the discrepancy between transmissity and reflectivity in the low brightness region can be reduced by combining the reflectivity with charge-refreshing and the reflectivity without charge-refreshing. For example, it is possible to combine 80% of the reflectivity with charge refreshing and 20% of the reflectivity without charge refreshing in order to carry out multi-threshold harmonization.

Figure 11C:
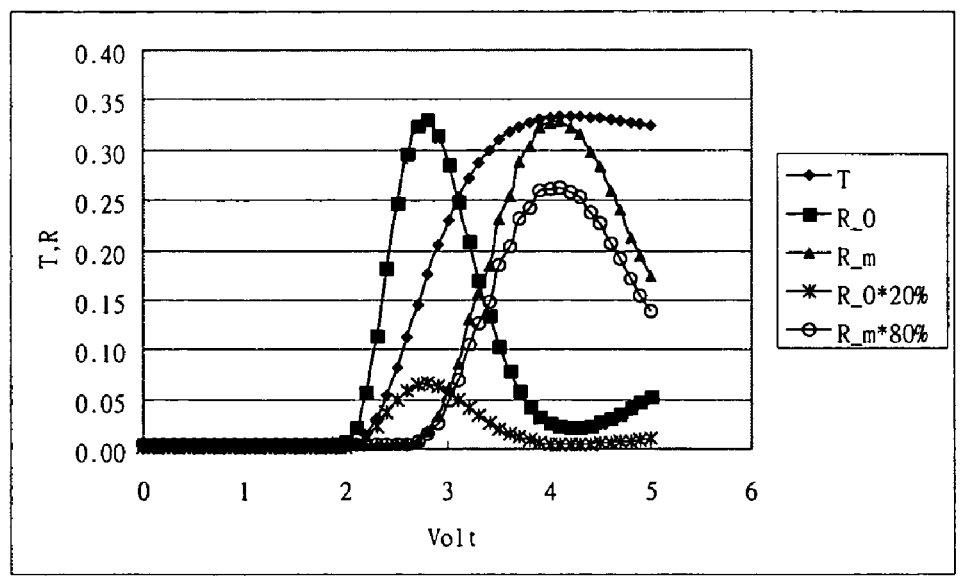
FIG. 11c is a plot of transmissivity and reflectivity against applied voltage showing an approach to multi-threshold harmonization, according to the present invention.
Figure 11D:
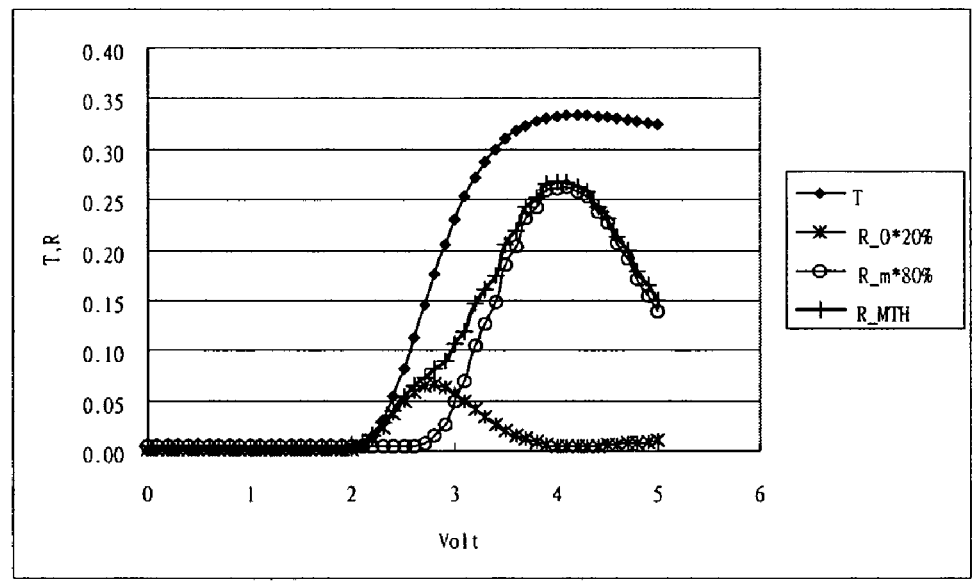
FIG. 11d is a plot of transmissivity and reflectivity against applied voltage showing as a result of multi-threshold harmonization.
Figure 11E:
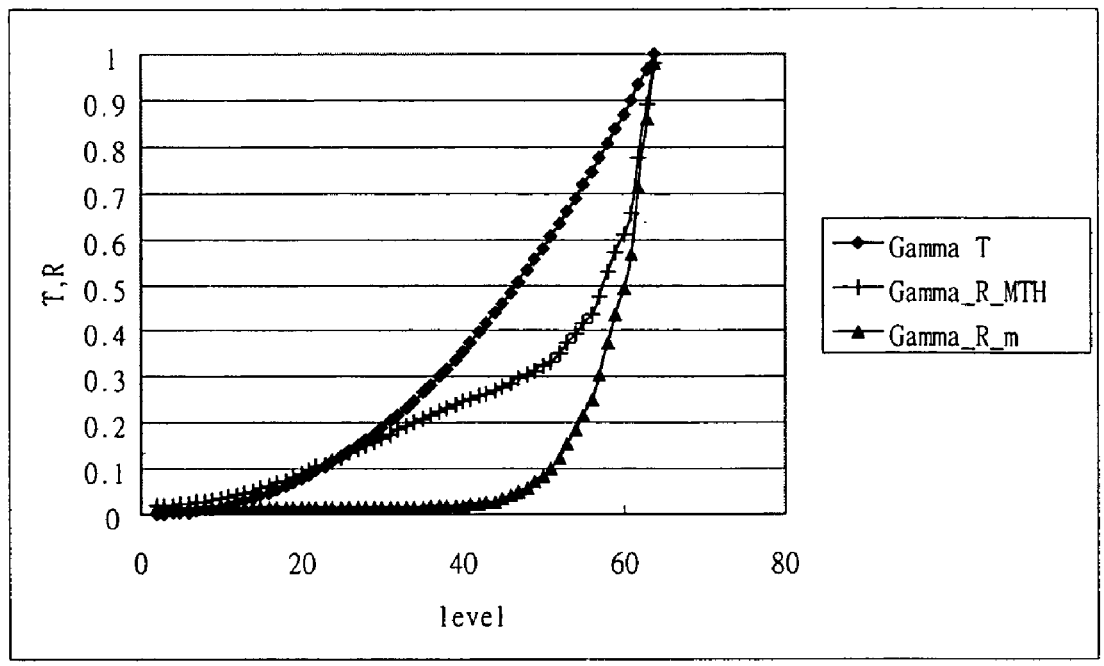
FIG. 11e is a plot of transmissivity and reflectivity as a function of gamma level, as a result of multi-threshold harmonization.

As shown in FIG. 4, the reflective electrode 192 is electrically connected to the transmissive electrode 190 in the secondary reflection section. Electrically, the reflective electrode 192 is separated from the reflective electrode 180. Thus, the reflectivity curve associated with the reflective electrode 192 does not shift toward the higher voltage end. As shown in FIG. 11c, the reflectivity curve (R−0*20%) associated with the reflective electrode 192 is peaked at the same applied voltage as the reflectivity curve (R__0) without charge refreshing. The reflectivity curve (R_m*80%) associated with the reflective electrode 180 is peaked about 4 v. The combined reflectivity (R_MTH) of these two reflectivity curves is shown in FIG. 11d. As can be seen from FIG. 11d, the matching between the transmissivity curve (Gamma_T) and the combined gamma curve (Gamma_R_MTH) in the multi-threshold harmonization is much better than the matching without multi-threshold harmonization (FIG. 11b). As such, the color and brightness quality at the low brightness end is significantly improved.

The matching between the transmissivity and reflectivity can be further adjusted by changing the non-charge refreshing reflectivity relative to charge refreshing reflectivity—the area ratio between reflector 192 and reflector 180 and by adding more charge refreshing stages—one or more reflective electrodes connected to different charge refreshing capacitors.

Figure 13:
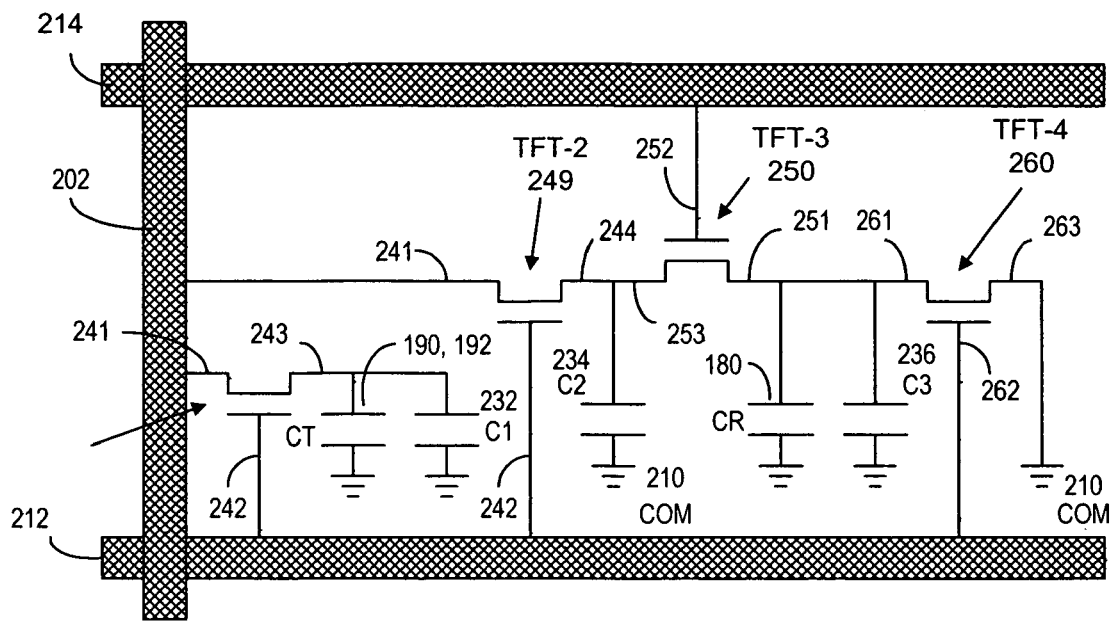
FIG. 13 is a circuit diagram showing the equivalent circuit of the sub-pixel segment of FIG. 12.
Figure 14:
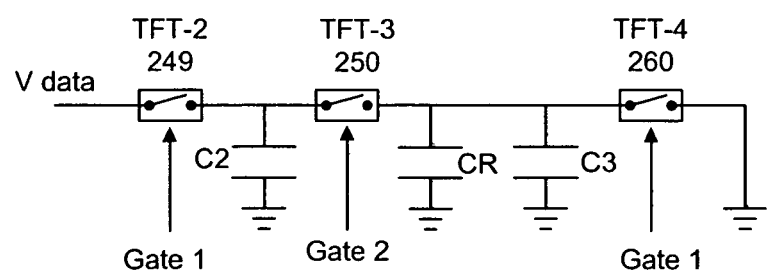
FIG. 14 is the equivalent circuit of the reflection area in the sub-pixel segment of FIG. 12.

In another embodiment of the present invention, the adjustment capacitor 236 is directly connected through the via 185 to the reflector 180 in parallel, and the second storage capacitor 234 is connected to the reflector 180 through the third switching element 250. The equivalent circuit is shown in FIG. 13. The charging and discharging of the capacitor CT and C1 remains the same as that shown in FIG. 8a. The charging and discharging of the capacitors CR, C2 and C3 is shown in FIG. 14.

Figures 15A, 15B:
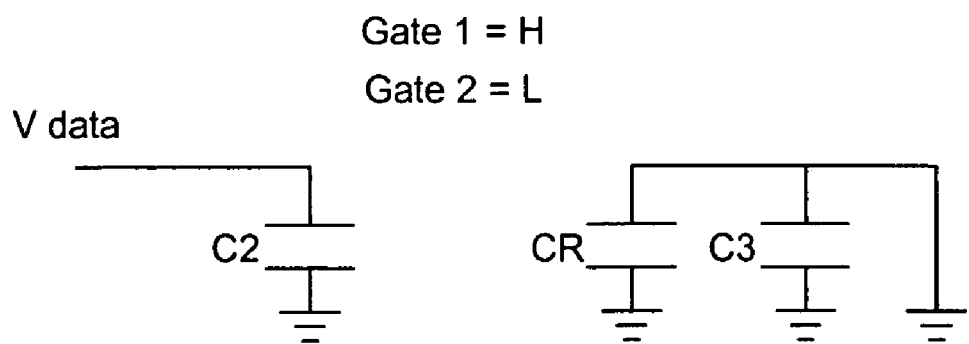
FIG. 15a is the equivalent circuit of the reflection area of FIG. 14 when the gate lines are set at the first control state.
FIG. 15b is the equivalent circuit of the control storage capacitor of FIG. 14 when the gate lines are set at the first control state.

In the first control state, gate-line 1 is set to high and gate line 2 is set to low. In this control state, CT, C1 and C2 are connected to the data line 202 and have the same potential ($V_{data}$) of the data line 202 (FIGS. 9a and 15a). C3 and CR are discharged but their potential is in equilibrium with the voltage on the common line 210 (FIG. 15b).

Figure 16:
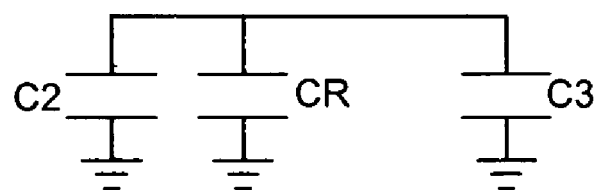
FIG. 16 is the equivalent circuit of the reflection area of FIG. 14 when the gate lines are set at a second control state.

In the second control state, gate-line 1 is set to low and gate-line 2 is set to high. The capacitor CT and C1 are disconnected from the data line 202, as shown in F*igure* 10a and their potential maintains the same for a period of time. The capacitors CR and C2 are now connected to the adjustment capacitor C3 in parallel as shown in FIG. 16. The overall capacitance associated with the reflector 180 is increased from (CR+C2) to (CR+C2+C3). As a result, the potential on the reflector 180 is reduced.

Figure 17A:
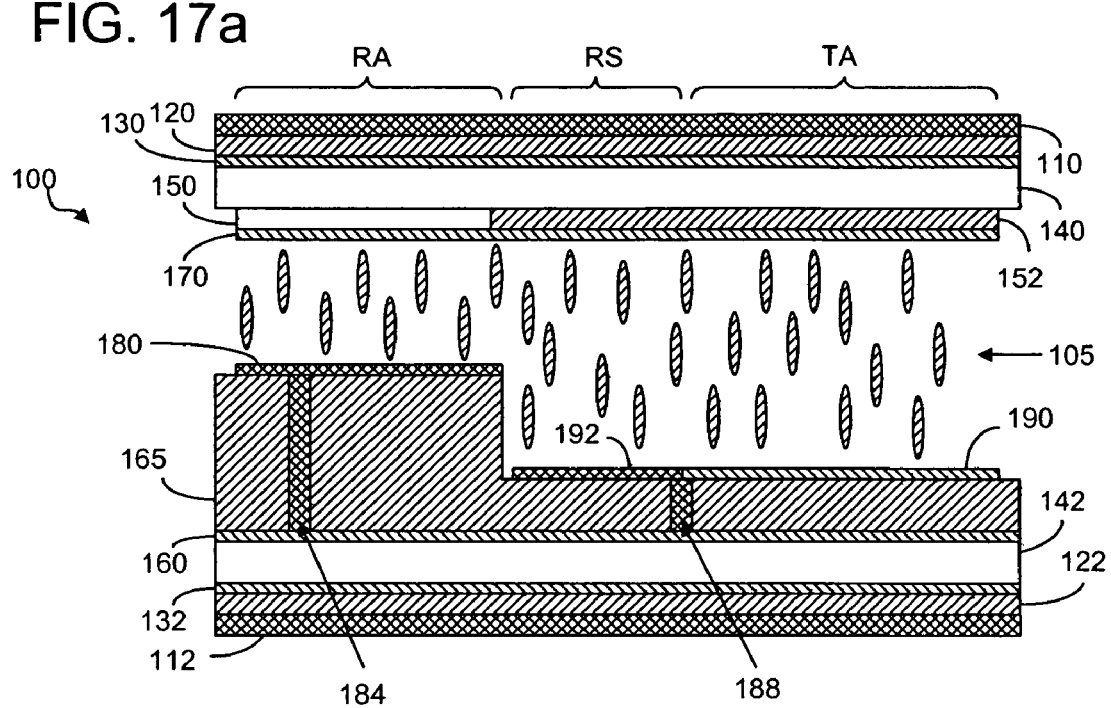
FIG. 17a is a schematic representation of a cross section view showing the color filtering arrangement in a sub-pixel segment of a double-gap transflective LCD, according to one embodiment of the present invention.
Figure 17B:
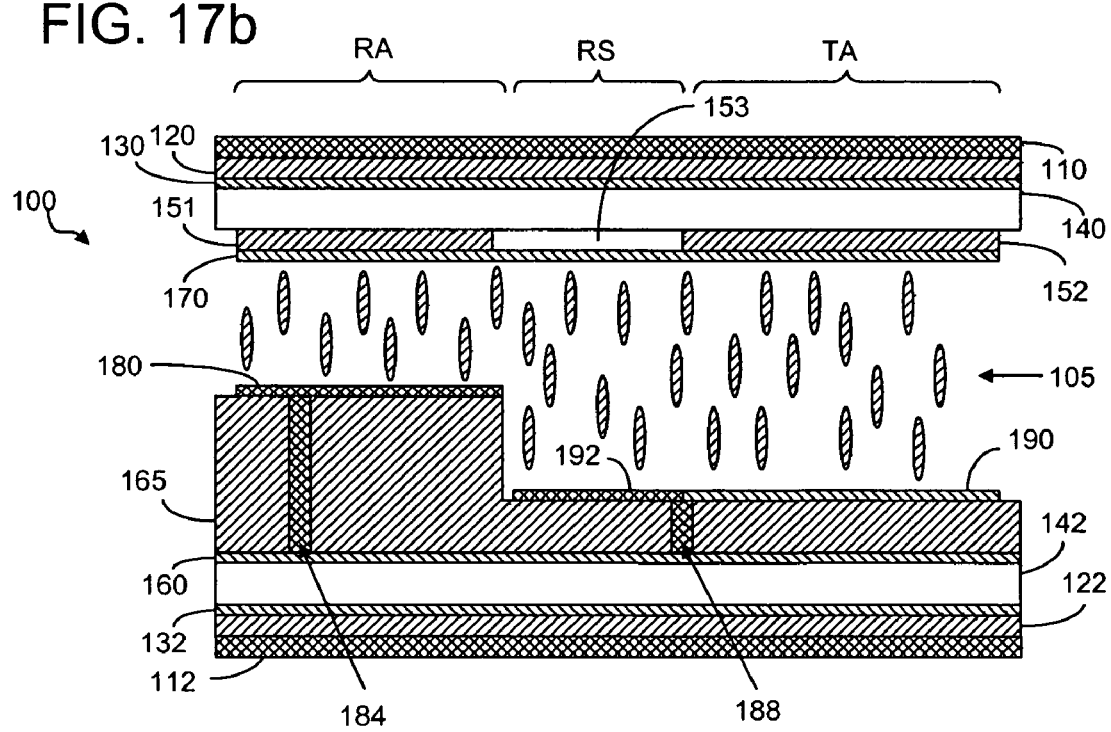
FIG. 17b is a schematic representation of a cross section view showing the color filtering arrangement in a sub-pixel segment of a double-gap transflective LCD, according to another embodiment of the present invention.

It is possible to extend the present invention from a single-gap design to a double-gap design, as shown in FIG. 17a and 17b. As shown, while the arrangement of reflector 192 in the reflection section (RS) and the color filtering arrangement for the upper substrate is the same as those shown in FIGS. 6a and 6b, the gap between the reflector 180 and the upper electrode 170 is reduced. The electrical connection between the reflector 180 and the device 160 can be the same as that shown in FIGS. 4 and 12 so as to allow the potential on the reflector 180 to be adjusted by the adjustment capacitor C3.

Figure 12:
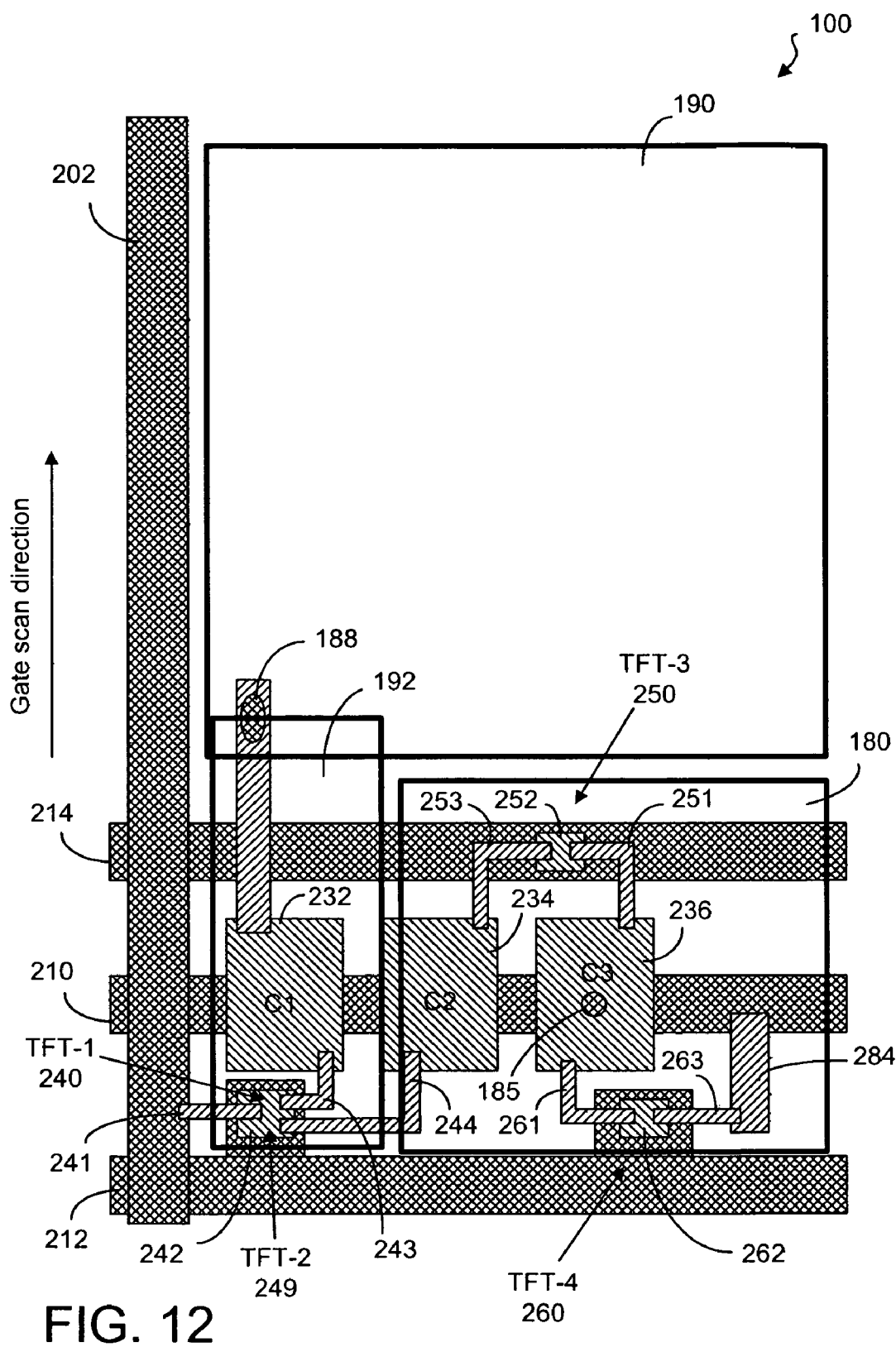
FIG. 12 is a plan view illustrating a sub-pixel segment in a liquid crystal display, according to a different embodiment of the present invention.

In sum, the use of the adjustment capacitor C3 for shifting the reflectivity curve toward the higher voltage end is referred to as charge refreshing and the adjustment capacitor is referred to as a charge refreshing capacitor. Charge refreshing is used to avoid the reflectivity inversion problem. In order to further improve the viewing quality of a single-gap LCD, a combination of charge-refreshing and non-charge-refreshing is used. In the embodiments as shown in FIGS. 4 and 12, only one charge-refreshing stage is used. However, one or more additional charge-refreshing stages can also be implemented. By combining the non-charge-refreshing reflectivity and the charge-refreshing reflectivity, it is possible to reduce the discrepancy between the gamma curve associated with the transmissivity and the gamma curve associated with the charge-refreshing reflectivity. Thus, according to the present invention, at least one reflective electrode is electrically connected to the transmissive electrode in a transflective LCD and at least one reflective electrode is electrically connected to a charge-refreshing capacitor.

The present invention provides a method for improving viewing quality of a transflective liquid crystal display. The liquid crystal display is operable in a first state and in a second state for controlling optical behavior of the liquid crystal layer, wherein at least one further reflective electrode is electrically connecting to the transmissive electrode, the further reflective electrode disposed spaced from the reflective electrode in the lower side of the liquid crystal display, allowing a further part of the light entering the sub-pixel from the upper side of the liquid crystal display through the liquid crystal layer to be reflected by the further reflective electrode through the liquid crystal layer back to the upper side, and wherein a first charge capacitance is provided to the transmissive electrode and the further reflective electrode, and a second charge capacitance is provided to the reflective electrode, the second charge capacitance having a relative capacitance value compared to the first charge capacitance, and wherein at least one of the first capacitance and the second capacitance is controlled such that the relative capacitance value when the liquid crystal display is operated in the first state is different from the relative capacitance value when the liquid crystal display is operated in the second state.

Effectively, the liquid crystal display is operable in a first voltage mode and in a second voltage mode for controlling optical behavior of the liquid crystal layer, wherein at least one further reflective electrode is electrically connecting to the transmissive electrode, the further reflective electrode disposed spaced from the reflective electrode in the lower side of the liquid crystal, allowing a further part of the light entering the sub-pixel from the upper side of the liquid crystal display through the liquid crystal layer to be reflected by the further reflective electrode through the liquid crystal layer back to the upper side, and wherein the reflective electrode is operated at the first voltage mode, and the transmissive electrode and said at least one further reflective electrode are operated at the second voltage mode.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A method for improving viewing quality of a transflective liquid crystal display having a first side, an opposing second side, and a liquid crystal layer disposed between the first and second sides, the display comprising a plurality of pixels, at least some of the pixels comprising a plurality of color sub-pixels, each color sub-pixels adapted for displaying a single color, each sub-pixel comprising a transmissive electrode and a first reflective electrode, the transmissive electrode disposed adjacent to the second side for allowing light entering the sub-pixel from the second side to be transmitted through the transmissive electrode and the liquid crystal layer and then through the first side, the first reflective electrode disposed adjacent to the second side spaced from the transmissive electrode for allowing a part of light entering the sub-pixel from the first side through the liquid crystal layer to be reflected by the first reflective electrode through the liquid crystal layer back to the first side, and wherein the liquid crystal display is operable in a first voltage mode and in a second voltage mode for controlling optical behavior of the liquid crystal layer, said method comprising the steps of:

electrically connecting at least one second reflective electrode to the transmissive electrode, the second reflective electrode disposed adjacent to the second side spaced from the first reflective electrode, allowing a further part of the light entering the sub-pixel from the first side through the liquid crystal layer to be reflected by the second reflective electrode through the liquid crystal layer back to the first side;

operating the first reflective electrode at the first voltage mode; and operating the transmissive electrode and said at least one second reflective electrode at the second voltage mode.

2. The method of claim 1, wherein the liquid crystal layer comprises a first layer section associated with the transmissive electrode and a second layer associated with the first reflective and the second reflective electrodes, and the first layer section has a first thickness and the second layer section has a second thickness substantially equal to the first thickness.

3. The method of claim 1, wherein the liquid crystal layer comprises a first layer section associated with the transmissive electrode and a second layer associated with the first reflective and the second reflective electrodes, and the first layer section has a first thickness and the second layer section has a second thickness smaller than the first thickness.

4. The method of claim 1, wherein the liquid crystal layer comprises a first layer section associated with the transmissive electrode and a second layer associated with the first reflective and the second reflective electrodes, and the first layer section has a first thickness and the second layer section has a second thickness substantially equal to half of the first thickness.

5. The method of claim 1, further comprising the step of:
disposing a color filter on the first side for filtering the light transmitted through the transmissive electrode and for filtering at least a portion of the further part of light reflected by the second reflective electrode.

6. The method of claim 1, further comprising the step of:
disposing a color filter on the first side for filtering the light transmitted through the transmissive electrode and for filtering at least a portion of the light reflected by the first reflective electrode.

7. The method of claim 1, wherein the transflective liquid crystal display comprises a plurality of data lines, said method further comprising:
electrically connecting the transmissive electrode to a ground via a first capacitor, and to one of the data lines via a first switching element for achieving the first voltage mode; and
electrically connecting the first reflective electrode to the ground via a second capacitor, to said one of the data lines via a second switching element, and to a refresh capacitor through a third switching element for achieving the second voltage mode.

8. The method of claim 7, wherein the transflective liquid crystal further comprises a plurality of gate lines, and wherein the third switching element comprises a first switching end connected to the first reflective electrode and a second switching end connected to the refresh capacitor, and the second switching end is further connected to the ground via a fourth switching element, and wherein the first switching element, the second switching element and the fourth switching element are configured to close ("ON") by a signal in one of the gate lines, and the third switching element is configured to close ("ON") by a signal in another one of the gate lines.

9. The method of claim 1, wherein the transflective liquid crystal display has a plurality of data lines, said method further comprising:
electrically connecting the transmissive electrode to a ground via a first capacitor, and to one of the data lines via a first switching element for achieving the first voltage mode; and
electrically connecting the first reflective electrode:
to the ground via a refresh capacitor,
to the ground via a third switching element and a second capacitor, and
to the ground via a fourth switching element, and wherein the second capacitor is electrically connected to said one of the data lines via a second switching element for achieving the second voltage mode.

10. The method of claim 9, wherein the transflective liquid crystal further comprises a plurality of gate lines, and wherein the first switching element, the second switching element and the fourth switching element are configured to close ("ON") by a signal in one of the gate lines, and the third switching element is configured to close ("ON") by a signal in another one of the gate lines.

11. A liquid crystal display device having an array of pixels, each pixel comprising a plurality of color sub-pixels, each color sub-pixel adapted for display a single color, the liquid crystal operable in a first state and in a second state, said display device comprising:
a first substrate having a common electrode;
a second substrate having a plurality of gate lines, a plurality of data lines and a plurality of common lines; the data lines and the gate lines arranged in different directions, and
a liquid crystal layer disposed between the first and second substrates, wherein each of at least some of the pixels is associated with a data line, a first gate line and a second gate line, each color sub-pixel comprising:
a first sub-pixel area and a second sub-pixel area, the first sub-pixel area having a transmissive electrode and at least one first reflective electrode electrically connected to the data line through a first switching element, the second sub-pixel area having a second reflective electrode electrically connected to the data line through a second switching element, wherein when the liquid crystal display is operated in the first state, the first and second switching elements are closed ("ON") and a first voltage potential between the transmissive electrode and the common electrode is substantially equal to a second voltage potential between the second reflective electrode and the common electrode, and
when the liquid crystal display is operated in the second state, the first and second switching elements are open ("OFF").

12. The display device of claim 11, wherein the second reflective electrode is electrically connected to a charge refresh capacitor through a third switching element such that when the liquid crystal display is operated in the first state, the third switching element is open ("OFF") and when the liquid crystal display is operated in the second state, the third switching element is closed ("ON").

13. The display device of claim 12, wherein the first switching element has a control end electrically connected to the first gate line, the second switching element has a control end electrically connected to the first gate line, and the third switching element has a control end electrically connected to the second gate line for causing the respective switching element to close or to open.

14. The display device of claim 12, wherein the third switching element is electrically connected to the refresh capacitor at one capacitor end, and said one capacitor end is further connected to one of the common lines through a fourth switching element, wherein the fourth switching element is closed ("ON") before the third switching element is closed ("ON") and the fourth switching element is open ("OFF") when the third switching element is closed ("ON").

15. The display device of claim 14, each of the first, second and fourth switching elements having a control end electrically connected to the first gate line.

16. The display device of claim 14, wherein each of the first, second, third and fourth switching element has a control end and each switching element comprises a thin-film transistor and the control end is the gate of the corresponding thin-film transistor.

17. The display device of claim 11, wherein the common electrode is electrically connected to one of the common lines.

18. The display device of claim 11, wherein said pixel comprises a color filter for filtering light transmitted through the transmissive electrode and for filtering light reflected by the first reflective electrode.

19. The display device of claim 11, wherein said pixel comprises a color filter for filtering light transmitted through the transmissive electrode and for filtering light reflected by the second reflective electrode.

20. A liquid crystal display device having an array of pixels, each pixel comprising a plurality of color sub-pixels, each color sub-pixel adapted for display a single color, the liquid crystal display device operable in a first state and in a second state, said display device comprising:
a first substrate having a common electrode;
a second substrate having a plurality of gate lines, including a gate-line n and a gate-line n+1, a plurality of data lines including a data line m, and a plurality of common lines; the data lines and the gate lines arranged in different directions;
a liquid crystal layer disposed between the first and second substrates, wherein one of the color sub-pixels is associated with the data line m, the gate line n and the gate line n+1, said color sub-pixels comprising:

a first sub-pixel area having a transmissive electrode and at least one first reflective electrode electrically connected to the data line m through a first switching element, and a second sub-pixel area having a second reflective electrode electrically connected to the data line m through a second switching element, the second sub-pixel area having a refresh capacitor having a first end and a second end, the second end electrically connected to one of the common lines, the second reflective electrode further connected to the first end of the charge refresh capacitor through a third switching element, each of the first and second switching elements having a control end electrically connected to the gate line n, the third switching element having a control end electrically connected to the gate line n+1, wherein when the liquid crystal display is operated in the first state, the first and second switching elements are closed ("ON") and the third switching element is open ("OFF"), such that a first voltage potential between the transmissive electrode and the common electrode is substantially equal to a second voltage potential between the second reflective electrode and the common electrode, the transmissive electrode and the refresh capacitor having an electric charge associated therewith, and when the liquid crystal display is operated in the second state, the first and second switching elements are open ("OFF") and the third switching element is closed ("ON") so as to cause a redistribution of the electric charge associated with the second pixel electrode and the refresh capacitor.

21. The display device of claim 20, wherein said pixel further comprises a fourth switching element and wherein the first end of the refresh capacitor is further connected to a common line through the fourth switching element, the fourth switching element having a control end electrically connected to the gate line n, wherein the fourth switching element is closed ("ON") before the third switching element is closed ("ON") and the fourth switching element is open ("OFF") when the switching third element is closed ("ON").

22. The display device of claim 21, wherein the common electrode is made from a transmissive material, electrically connected to one of the common lines.

23. The display device of claim 20, wherein said pixel comprises a color filter for filtering light transmitted through the transmissive electrode and for filtering light reflected by the first reflective electrode.

24. The display device of claim 20, wherein said pixel comprises a color filter for filtering light transmitted through the transmissive electrode and for filtering light reflected by the second reflective electrode.

* * * * *